United States Patent
Viaud

(10) Patent No.: US 8,499,685 B2
(45) Date of Patent: Aug. 6, 2013

(54) ROUND BALER

(75) Inventor: Jean Viaud, Reyssouze (FR)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 12/771,320

(22) Filed: Apr. 30, 2010

(65) Prior Publication Data

US 2011/0113975 A1    May 19, 2011

(30) Foreign Application Priority Data

May 8, 2009   (EP) ..................................... 09159827

(51) Int. Cl.
*B30B 5/04*    (2006.01)

(52) U.S. Cl.
USPC ............................................. 100/88; 56/341

(58) Field of Classification Search
USPC .................................. 100/87, 88, 89; 56/341
See application file for complete search history.

(56) References Cited

U.S. PATENT DOCUMENTS

| | | | |
|---|---|---|---|
| 4,334,467 A | * | 6/1982 | Nishibe et al. ................. 100/89 |
| 2008/0257177 A1 | * | 10/2008 | Toor et al. ..................... 100/249 |

FOREIGN PATENT DOCUMENTS

| | | |
|---|---|---|
| DE | 4105078 | 2/1991 |
| EP | 1595483 | 10/2005 |

OTHER PUBLICATIONS

Krone RoundPack, printing reference Round Pack 1250/1550 (D), 44 Pages.

* cited by examiner

*Primary Examiner* — Jimmy T Nguyen

(57) ABSTRACT

A round baler has bale chamber partly covered by a web spanning at least the distance between its side walls. The web is guided slideably on a path following the shape of the bale chamber.

7 Claims, 2 Drawing Sheets

ROUND BALER

FIELD OF THE INVENTION

This invention relates to a round baler having a bale chamber. The width of the bale chamber is covered by an endless flexible web and the sides of the bale chamber are covered by walls. The endless flexible web is routed about rolls.

BACKGROUND OF THE INVENTION

DE 41 05 078 discloses a fixed chamber round baler, wherein the bale chamber is covered on its circumference by a belt, extending between sidewalls and delimiting the bale chamber laterally. Stiff bars extend through the single belt to prevent its inward deflection and the stiff bars being provided with wheels, which run in a channel of a substantially semi-circular form.

EP 1 595 483 discloses a round baler having a belt-slat conveyor extending beyond side walls of a baling chamber and running over support wheels. Since the belts initially extend straight between the support wheels, but deflect when sufficient crop enters the bale chamber, a gap appears between the belt run and the outer edge of the side wall, into which crop can enter and create a blockage.

The document entitled "KRONE RoundPack, printing reference Round Pack 1250/1550 (D) shows a round baler with a chain-bar conveyor, wherein rolls are provided at the end of the bars. These rolls are supported on a track behind the sidewalls of a bale chamber, and the bars move along but spaced from the sidewall edge. Between the bars and the outer edge of the side wall a gap is provided.

Accordingly, the problem this invention is based on is seen in the need for an inexpensive single belt spanning a fixed bale chamber laterally without creating blockages.

SUMMARY OF THE INVENTION

As taught herein no bars and rolls known from the prior art are exposed to the baling material and no gap exists between the web or belt and an adjacent edge of the side wall. Instead of bars and rolls the web itself will moves in a path and glides at least substantially along the edge of the walls. The round baler may be of a fixed chamber type, or a hybrid type, i.e. with a fixed chamber portion in the front or the rear and a variable chamber portion in the rear or the front. The web can be of rubber material with reinforcement filaments, or configured with slats bolted onto a belt or chain carrier gliding along a path. The web in the preferred embodiment has a closed surface.

In order to reduce the power required to drive such a round baler the path and/or the web portion contacting the path is provided with a low friction surface. Low friction material may be of the PTFE type or the like. If such material is part of the web, it should be provided only in the gliding area. Also, a rib may be glued or otherwise fastened on the lateral portion of the web.

Further reduction of the required driving force is achieved by using rolling elements, like wheels, balls, bushings etc. Such rolling elements may be journaled in or on bearings, kept in recesses, or be part of a chain, which is fixed on the path behind the leading surface of the side wall, such that no material can reach it.

If the path is formed by a guide element on a structure like a frame or outer walls extending towards the bale chamber the guide element will be covered by the sidewall of the bale chamber.

In order to further reduce the required drive force, between the downstream end of the path and a subsequent roll an idler decreasing the pressure of the web on the path is provided. The idler is preferably rotatable, but could also be stationary with a hard and low friction surface. Such an idler could be a wheel, which, if needed, can even be driven. At the downstream end of the path the pulling power is higher than at the upstream end and such an idler will avoid that the web is pushed onto an edge at the exit of the path, but still follows substantially a circular path.

Driving a roll upstream of the path slightly faster than a roll downstream of the path will reduce friction in the path, since the web and with it the bale will be slightly pushed. Such different speed may be adjustable due to the operational circumstances, but the differential speed will be in the low percentage region.

The web is further hindered from collapsing into the bale chamber, if it is stiffened by fibers extending transverse to the moving direction of the web, whereas such fibers will be stiffer than fibers extending in the moving direction. Such fibers can be of metal or plastic and even of a strength varying over the width or being arranged in a number and size of layers varying across the width of the web.

In order to assure that the web is properly driven and routed well, a tension mechanism acts on the web. Preferably the tension mechanism acts on the run of the web not in contact with the material to be baled.

A hybrid type baler is created, if one part of the bale chamber is covered circumferentially by the web, whereas another part is covered by baling elements or means being moveable to provide for a variable bale chamber. The moveable parts may be rolls, belts on moveable rolls, chain- or belt and slat conveyors, etc.

Production costs are kept low, if the path is formed by the edge of the side walls, whereas the edge may be covered by a protector or by a bent edge.

Since a web may be deformed due to the external material forces a lateral stiffener assists in keeping the web properly in the path. Such a stiffener could be a metal stripe, a layer of inserted fibers, etc.

BRIEF DESCRIPTION OF THE DRAWINGS

In the detailed description which follows reference is made to the attached drawing figures wherein.

DESCRIPTION OF THE PREFERRED EMBODIMENT

Figure 1:
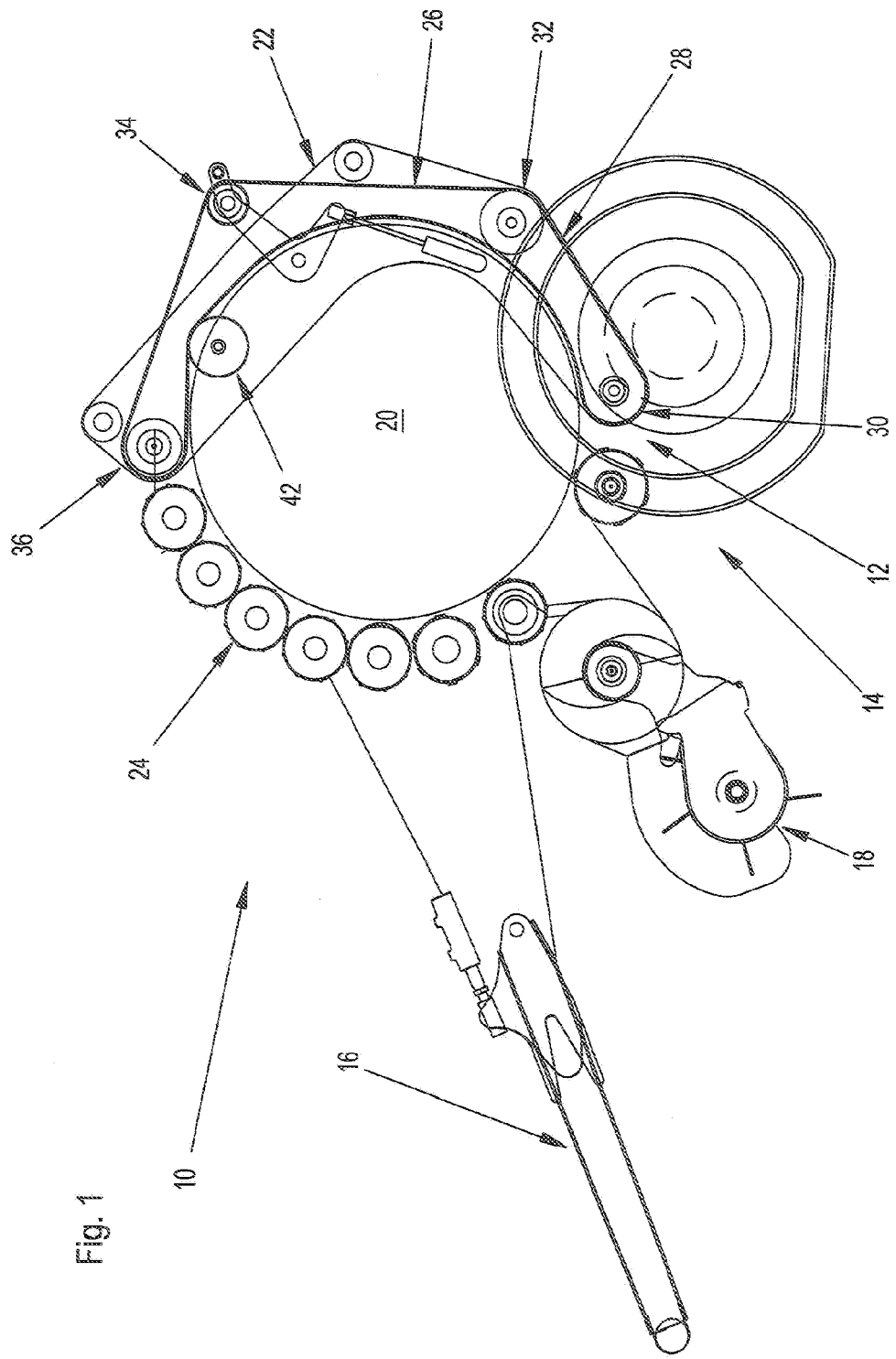
FIG. 1 is a side view of round baler according to the invention.
Figure 2:
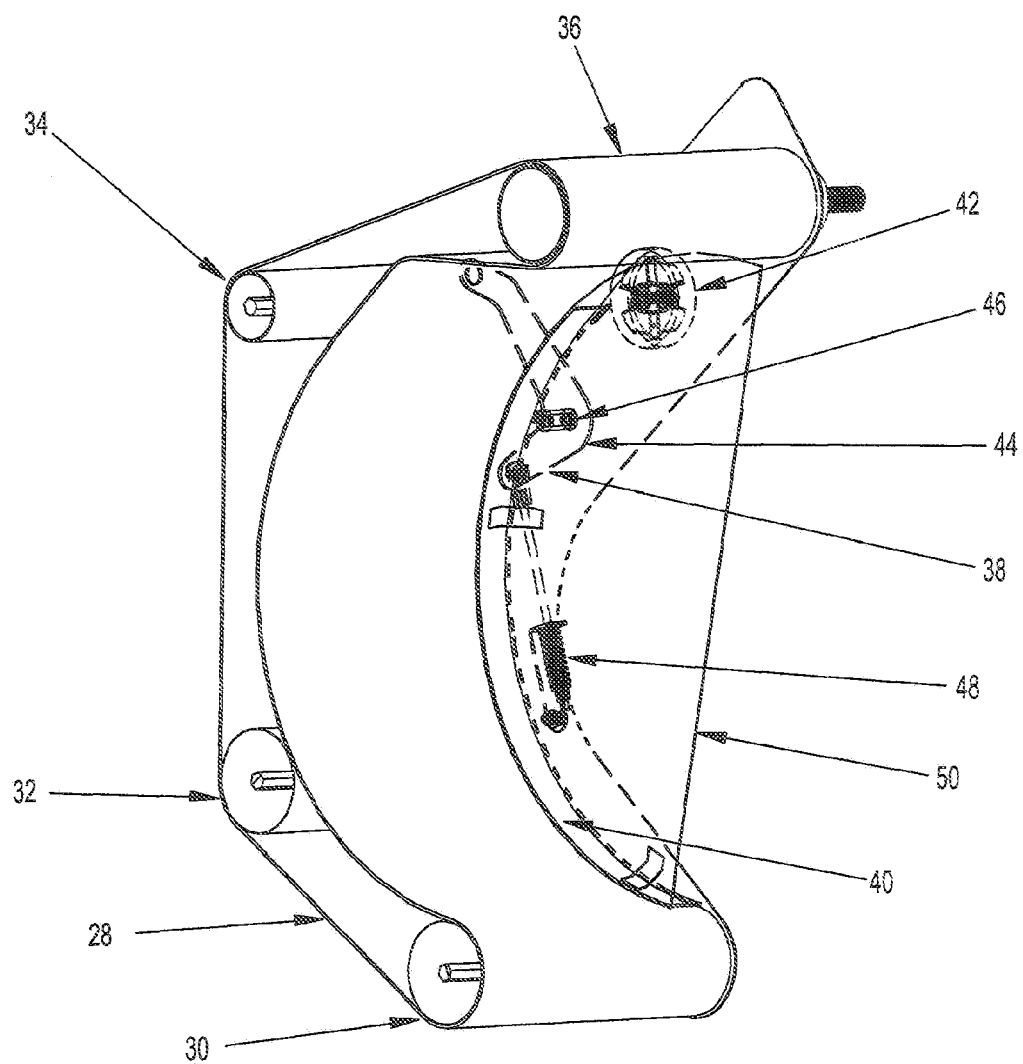
FIG. 2 a perspective view of rear part of the round baler of FIG. 1 with a wide web carried on a path on both sides.

FIG. 1 shows a round baler 10 having a frame 12, a chassis 14, a tongue 16, a feeder 18 and a bale chamber 20.

The round baler 10 as shown is of the fixed chamber type, i.e. the bale chamber 20 is of fixed size in the front and of fixed size in the rear; it could be also of a variable chamber type in the front and/or the variable chamber type could be in the rear and the fixed type in the front. While the round baler 10 is mobile, it could also be stationary for use in industry. Normally it is moved over a field to bale harvested crop like straw, hay, grass, cotton or the like, whereas in industry it may bale paper, garbage, etc.

The frame 12 is of a welded and bolted structure, which is not shown in detail here, but is well known in the art, like from JOHN DEERE round balers, and is supported on the chassis 14. Part of the frame 12 consists of lateral outer structures 22, extending vertically and distant from each other in a horizontal direction. These structures 22 may be of one part, along the length of the bale chamber 20, or of two parts, being split substantially vertically in about the center of the bale chamber 20—both types being well known in the art. The outer structures 22 are big enough to cover the bale chamber 20 laterally, but do not touch the bale rotating in the bale chamber 20.

The chassis 14 comprises an axle, wheels, suspension and the like, whatever is necessary to support the frame 12 moveably on the ground.

The tongue 16 connects the round baler 10 to a towing vehicle and is fixed to the frame 12 or the chassis 14.

The feeder 18 may comprise a pick-up and/or a cutting rotor and/or a cross auger. The latter are not necessary for a round baler, but are often used. The feeder 18 is carried by the frame 12, and is variable in height so as to adjust to the ground contour, and feeds material normally lying on the ground rearward into the bale chamber 20.

The bale chamber 20 is surrounded by bale forming means 24 in the front and bale forming means 26 in the rear. The round baler described thus far is described in more detail in DE 102004002976 A1, which is incorporated herein by reference. However it should be clear, that many other embodiments of round balers may be used together with the invention as will be described below.

The bale chamber 20 is covered laterally by inner or side walls 50 extending parallel to the outer structures 22, but being offset inwardly, as it will be explained later, and thus actually covering the bale chamber 20 laterally.

The bale forming means 24 in the front are formed as a series of stationary rolls arranged substantially on a semicircle as is widely known. These rolls are driven in a conventional manner and thus not described in further detail.

The bale forming means 26 in the rear mainly contains a single endless, closed surface flexible web 28, i.e. spanning the entire bale chamber 20 and being of a material known from current round balers on the market. Such a web 28 has several layers of fibers in the lengthwise and crosswise direction and is covered on both sides with rubber or the like having a smooth or profiled surface. The web 28 could be made endless by connecting existing ends or by producing it as a single piece. Furthermore and as will become apparent from the further description the web 28 has a different function in its center area as compared to its lateral end areas, since in the inner or center area it is in contact with the material to be baled and to be moved by the web 28, whereas in the lateral end areas the web 28 has to glide in or on a path 40. Accordingly, it may be of different material types or configurations in its different regions, like of a kind creating more friction in the center area compared to the outer areas. Internal crosswise extending fibers (not shown) will be of such strength, that they reinforce the web 28 from collapsing into the bale chamber 20 in its upper section. A similar effect may be achieved by fibers being arranged in different layers with respect to the press material contact surface of the web 28, which fibers are connected to each other to provide additional stiffness, like a flat bar extending radially with respect to the centerline of a bale in the bale chamber 20. Other fibers will extend in the lengthwise direction of the web 28.

The web 28 is routed over a lower front roll 30, a lower rear roll 32, an upper rear roll 34, and an upper front roll 36. The lower front and rear rolls 30 and 32 respectively are journaled freely in the outer structures 22 and act as idler rolls, although the lower front roll 30 could be driven to assist in moving the web 28 with the bale. The upper rear roll 34 is journaled moveably against the force of a tensioning mechanism 38, but is idling only. The upper front roll 36 is driven and rubber covered so as to create enough friction to move the web 28. All, some or just one of the rolls 30-36 may have a barrel shape, which assists in keeping the web 28 centered. Furthermore a path 40 is provided in the form of a sheet metal, bar, rail or the like connected to outer structures 22. The path 40 follows the shape of the bale chamber 20 for the completed bale, i.e. fully or partly circular. The part creating the path 40 is connected to the outer structure 22 by means of angles, blocs or the like by bolting, welding or similar. The web 28 overlaps the path 40 and can thus glide on it. The surface of the path 40 is provided with or covered by low friction material, such as a PTFE material. The web 28 is moving inside the bale chamber 20 upwardly and outside of it downwardly. It could also be the opposite way, whereas the function of the rolls 30 and 36 needs to be adjusted.

An idler 42 is also provided between the downstream end of the path 40 and the upper front roll 36 to guide the inner run of the web 28. The idler 42 is located such, that it deflects the web 28 away from the edge of path 40 to reduce the friction of the web 28 on the end edge of the path 40.

The tensioning mechanism 38 has a L-shaped lever 44 on each side, each journaled on an axle 46 connected to the outer structure 22. One leg of the lever 44 carries the roll 34, whereas the other leg of the lever 44 is connected to a spring assembly 48. The spring assembly 48 has a spring and a bar bearing against a stop on the outer structure 22, which results in a movement of the lever 44 about the axle 46 such, that the web 28 is tensioned.

Attached at a slight distance to the outer structure 22 and abutting the path 40 is an inner or side wall 50, which actually delimits the bale chamber 20 laterally. The inner wall 50 is fastened to either the outer structure 22 or to the path 40 by appropriate means, like bolts, etc. The radially outer edge of these inner walls 50 follows the circular contour of the bale chamber 20 and provides a shoulder on which the web 28 will rest and glide. The tensioning mechanism 38 may be provided in the space between the inner walls 50 and the structures 22. Idler 42 is also arranged between the inner walls 50 and outer structures 22, whereas the idlers 42 extend beyond the outer surface of the path 40 to touch the web 28 tangentially.

Having described the preferred embodiment, it will become apparent that various modifications can be made without departing from the scope of the invention as defined in the accompanying claims.

The invention claimed is:

1. A round baler comprising a bale chamber, the width of the bale chamber being covered by a flexible web, the sides of the bale chamber being covered by side walls, the web being endless and routed about rolls, a path aligned with the shape of the bale chamber, and a rotatable idler is provided on the path for decreasing a pressure of the web, wherein a run of the web facing the bale chamber is moved on a surface of the path, and the path contacts the web substantially holohedrally, such that no gap exists between the web and an adjacent edge of the side wall, wherein the path is formed as a stationary guide element extending transverse to the bale chamber between the side wall and one of an outer structure and a frame of the baler, and wherein the rotatable idler is located between a downstream end of the path and a subsequent roll.

2. A round baler according to claim 1, wherein at least one of the path and a portion of the web contacting the path is provided with a low friction surface.

3. A round baler according to claim 1, wherein rolling elements are provided along the path behind a leading surface of the side wall.

4. A round baler according to claim 1, wherein a roll upstream of the path is driven faster than a roll downstream of the path.

5. A round baler according to claim 1, wherein a tension mechanism acts on the web.

6. A round baler according to claim 1, wherein one part of the bale chamber is covered circumferentially by the web, and wherein another part of the bale chamber is covered by moveable bale forming means so as to provide a bale chamber of varying size.

7. A round baler according to claim 1, wherein the path is formed by an edge of inner walls.

* * * * *